(12) United States Patent
Xu et al.

(10) Patent No.: US 8,989,580 B2
(45) Date of Patent: Mar. 24, 2015

(54) LONG-DISTANCE BOX AND METHOD FOR PROCESSING UPLINK AND DOWNLINK LIGHT THEREOF

(75) Inventors: Jidong Xu, Shenzhen (CN); Dezhi Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 253 days.

(21) Appl. No.: 13/576,180

(22) PCT Filed: Dec. 2, 2010

(86) PCT No.: PCT/CN2010/079388
§ 371 (c)(1),
(2), (4) Date: Jul. 31, 2012

(87) PCT Pub. No.: WO2011/137645
PCT Pub. Date: Nov. 10, 2011

(65) Prior Publication Data
US 2012/0294615 A1 Nov. 22, 2012

(30) Foreign Application Priority Data
May 1, 2010 (CN) .......................... 2010 1 0173399

(51) Int. Cl.
*H04J 14/00* (2006.01)
*H04B 10/25* (2013.01)
(Continued)

(52) U.S. Cl.
CPC ........ *H04B 10/2503* (2013.01); *H04J 14/0282* (2013.01); *H04Q 11/0067* (2013.01);
(Continued)

(58) Field of Classification Search
CPC ............. H04B 10/2503; H04J 14/0282; H04J 14/0246; H04J 14/0247; H04J 14/0252; H04J 14/025; H04Q 11/0067; H04Q 2011/0073
See application file for complete search history.

(56) References Cited

U.S. PATENT DOCUMENTS

| 4,378,951 A * | 4/1983 | Nagao .............................. 385/47 |
| 2008/0181613 A1* | 7/2008 | Bouda ............................. 398/98 |

(Continued)

FOREIGN PATENT DOCUMENTS

| CN | 101425852 A | 5/2009 |
| CN | 101478348 A | 7/2009 |

(Continued)

OTHER PUBLICATIONS

Gigabit capable passive optical networks (GPON): Reach extension; G.984.6 (2008) Amendment Nov. 13, 2009.
(Continued)

*Primary Examiner* — Ken Vanderpuye
*Assistant Examiner* — David Lambert
(74) *Attorney, Agent, or Firm* — Oppedahl Patent Law Firm LLC (57) ABSTRACT

The disclosure provides a long-distance box and a method for processing uplink light and downlink light of the long-distance box, uplink light and downlink light from different Passive Optical Network (PON) systems are split, the uplink light from the different PON systems is transmitted through a first optical path, and the downlink light from the different PON systems is transmitted through a second optical path; wherein the uplink light from the different PON systems is amplified by an Optical Amplifier (OA) and then output to Optical Line Terminals (OLT) of respective systems; the downlink light from different PON systems with the different wavelengths is transmitted through different optical sub-paths of the second optical path according to the wavelengths of the downlink light, and the downlink light is amplified by different Optical-Electrical-Optical (OEO) conversion devices on the different optical sub-paths and then output to Optical Network Units (ONUs) of the respective systems. The disclosure applies a hybrid long-distance box combining OEO and OA technologies to process a point-to-multipoint fiber access of a coexisting PON system, integrates advantages of both OA and OEO, and has high reliability, such that both uplink light and downlink light from different PON systems are amplified effectively.

5 Claims, 4 Drawing Sheets

(51) Int. Cl.
*H04J 14/02* (2006.01)
*H04Q 11/00* (2006.01)

(52) U.S. Cl.
CPC .......... *H04J14/0246* (2013.01); *H04J 14/0247* (2013.01); *H04J 14/025* (2013.01); *H04J 14/0252* (2013.01); *H04Q 2011/0073* (2013.01)
USPC .................... 398/72; 398/68; 398/70; 398/71

(56) References Cited

U.S. PATENT DOCUMENTS

| | | | |
|---|---|---|---|
| 2009/0060507 A1 | 3/2009 | Effenberger et al. | |
| 2009/0110398 A1 | 4/2009 | Pfeiffer | |
| 2010/0239257 A1* | 9/2010 | Grossman et al. | 398/68 |

FOREIGN PATENT DOCUMENTS

| | | |
|---|---|---|
| CN | 101630979 A | 1/2010 |
| WO | 2009030161 A1 | 3/2009 |

OTHER PUBLICATIONS

Gigabit capable passive optical networs (GPON): Reach extension; G.984. 6 (Mar. 2008) Mar. 29, 2008.

10 GB/supgrade for high-split and long-reach PON using remote repeater Jul. 7, 2008.

Trends in Standardiyation of Optical Access Networks in ITU-T Feb. 1, 2010.

10 Gigabit capable passive optical networks (XG-PON) Jan. 13, 2010.

Supplementary European Search Report in European application No. 10851014.0, mailed on Feb. 17, 2014.

International Search Report in international application No. PCT/CN2010/079388, mailed on Mar. 10, 2011.

English Translation of the Written Opinion of the International Search Authority in international application No. PCT/CN2010/079388, mailed on Mar. 10, 2011.

* cited by examiner

LONG-DISTANCE BOX AND METHOD FOR PROCESSING UPLINK AND DOWNLINK LIGHT THEREOF

TECHNICAL FIELD

The disclosure relates to an optical network system, and in particular to a long-distance box and a method for processing uplink and downlink light thereof, applicable to a coexisting Passive Optical Network (PON) system.

BACKGROUND

A rapid development and low cost requirement of a cable wideband access technology promote a development of gradually replacing an existing copper (cable) system with optical fiber, that is, exit of copper and development of the optical fiber have become a trend. Simultaneously, with broadest, fastest and most environmentally friendly features of PON, and with features of a long-distance PON having a structure for a flat and simplified network, and advantages such as adaptation to a network structure with a long distance, reduced investment cost and the like, PON is being accepted by most operators and starts to or is ready to be deployed, in order to satisfy gradually increased communication users and faster and better service demand.

Figure 1:
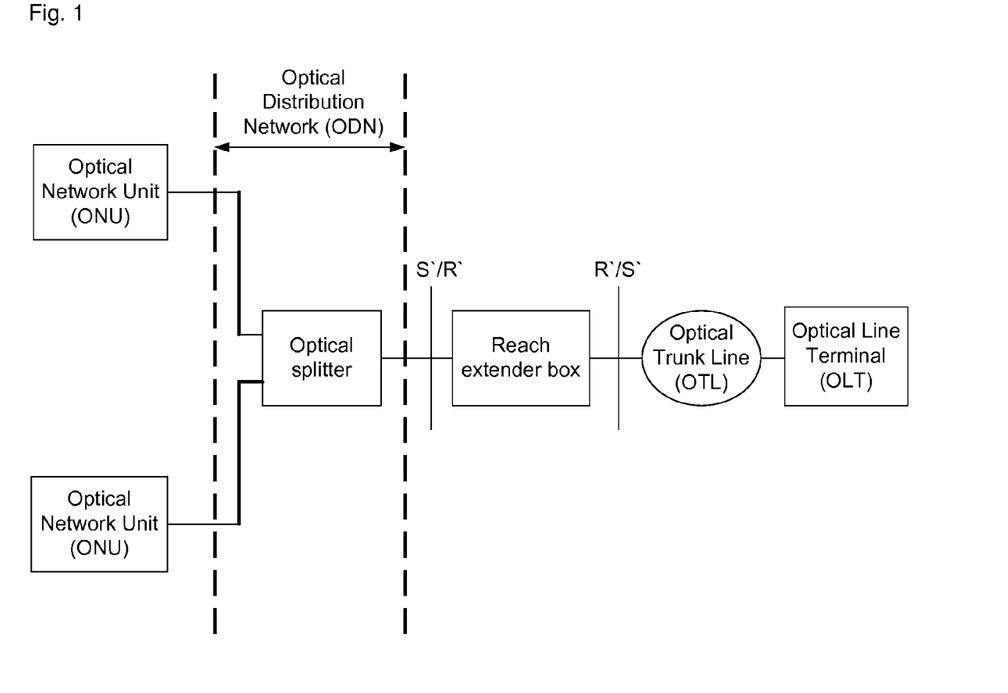
FIG. 1 shows a structure diagram of an existing long-distance passive optical network.

A long-distance PON is a point-to-multipoint optical fiber access technology. FIG. 1 shows a structure diagram of an existing long-distance passive optical network, and as shown in FIG. 1, the long-distance passive optical network includes an Optical Line Terminal (OLT), an Optical Network Unit (ONU) and an Optical Distribution Network (ODN). Generally, one OLT is connected with multiple ONUs through a light reach extender box (also called long-distance box) and a light power separator (short for optical splitter) to form a point-to-multipoint structure, as shown in FIG. 1.

Figure 2:
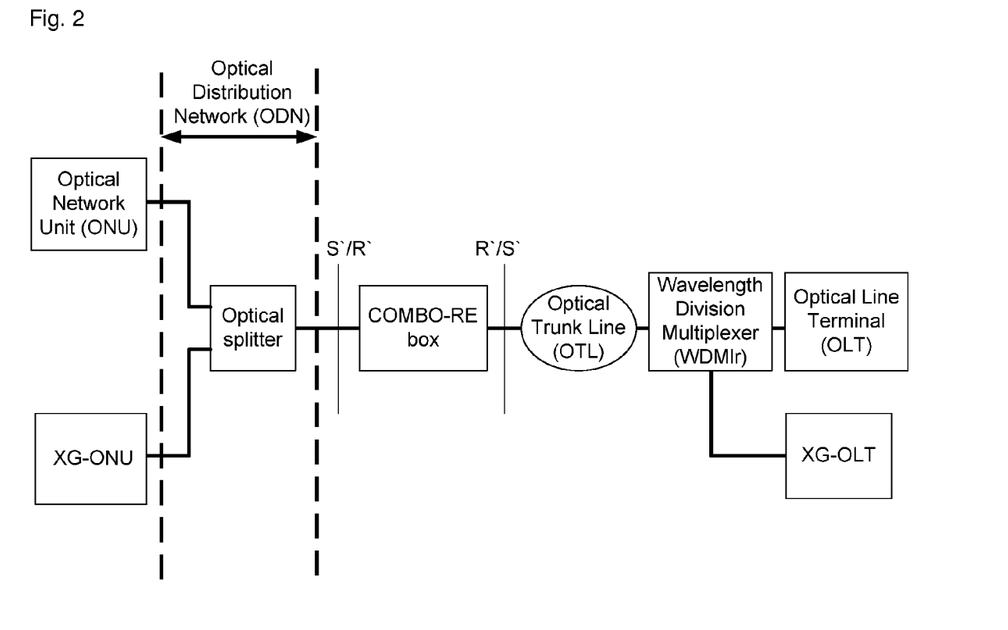
FIG. 2 shows a structure diagram of a coexisting long-distance passive optical network.

At present, in order to reduce investment cost and achieve multiplexing of ODN, several PON systems (hereinafter referred to as coexisting PON system) may share one ODN in a passive optical network. As shown in FIG. 2, FIG. 2 shows a structure diagram of a coexisting long-distance passive optical network, as different PON systems, such as, a PON system with coexistence of such two kinds of PONs: a GPON and an XG-PON, generally have different uplink and downlink wavelengths, wherein the downlink wavelength of a GPON is 1480 nm-1500 nm and the uplink wavelength of the GPON is 1290 nm-1330 nm, while the downlink wavelength of an XG-PON is 1575 nm-1581 nm and the uplink wavelength of the XG-PON is 1260 nm-1280 nm. An existing long-distance box is mainly designed for a single-PON system, for a system in which multiple PONS coexist, long-distance boxes for a single-PON system cannot be used for such the system in which the multiple PONS coexist, therefore a synthetic long-distance box is required to satisfy such demand, as shown in FIG. 2.

SUMMARY

In view of the above problem, the main purpose of the disclosure is to provide a long-distance box and a method for processing uplink light and downlink light of the long-distance box, capable of being reliably applied in a case where multiple different PON systems run in one ODN.

In order to achieve the purpose, the technical solution of the disclosure is realized as follows.

A long-distance box for a Passive Optical Networks (PON) system in which different PONS coexist mainly includes an optical diplexer, an Optical Amplifier (OA), a wavelength division multiplexing filter, Optical-Electrical-Optical (OEO) conversion device and a local management box, wherein, the optical diplexer connects the long-distance box to a trunk optical fiber, and is configured to split uplink lights and downlink lights from the different PON systems, wherein the uplink lights from the different PON systems are transmitted through a first optical path, and the downlink lights from the different PON systems are transmitted through a second optical path;

the optical amplifier is located on the first optical path, and configured to amplify the uplink lights from the different PON systems and then output the amplified uplink lights;

the wavelength division multiplexing filter is located on the second optical path, and configured to divide the second optical path into different optical sub-paths according to different wavelengths, wherein the downlink lights from the different PON systems are amplified by the different optical sub-paths and then output;

the OEO conversion devices are located in the different optical sub-paths of the second optical path respectively, and configured to amplify the downlink lights from the different PON systems; and the local management box is connected with an Optical Line Terminal (OLT) through a TAP coupler and the trunk optical fiber, and the OLT controls and manages the optical amplifier and the OEO conversion devices through the local management box.

The PON coexistence system may include a first PON system and a second PON system; wherein a uplink light from the first PON system and a uplink light from the second PON system have an overlapped wave band; and a downlink light from the first PON system and a downlink light from the second PON system have different wavelengths.

The optical diplexer may include a first optical diplexer and a second optical diplexer; wherein the uplink light from the first PON system and the second PON system enter the first optical path through the second optical diplexer from a branch optical fiber and an optical splitter; and the downlink light from the first PON system and the downlink light from the second PON system enter the second optical path through the first optical diplexer from the trunk optical fiber.

The optical diplexer may consist of an optical circulator and has three interfaces, wherein a first interface is a light input port, a second interface is a light input/output port, and a third interface is a light output port; wherein the first interface of the first optical diplexer is connected with the first optical path, the second interface of the first optical diplexer is connected with the trunk optical fiber, and the third interface of the first optical diplexer is connected with the second optical path; and the first interface of the second optical diplexer is connected with the second optical path, the second interface of the second optical diplexer is connected with the optical splitter, and the third interface of the second optical diplexer is connected with the first optical path.

The wavelength division multiplexing filter may include a first wavelength division multiplexing filter and a second wavelength division multiplexing filter; wherein, the first wavelength division multiplexing filter respectively outputs the downlink lights which enter the second optical path from the first optical diplexer to the different optical sub-paths, and the second wavelength division multiplexing filter combines the downlink lights from the different optical sub-paths and then outputs the combined downlink light to the second optical diplexer.

The wavelength division multiplexing filter may consist of a sideband filter and include a R interface, a P interface and a C interface; wherein the downlink light from the first PON system is reflected and input/output only through the R interface, and the downlink light from the second PON system is transmitted and input/output only through the P interface; and the C interface is connected with the optical diplexer at the trunk optical fiber;

the C interface of the first wavelength division multiplexing filter is connected with the third interface of the first optical diplexer, the R interface the first wavelength division multiplexing filter is connected with one end of a first OEO device in one of the optical sub-paths, and the P interface of the first wavelength division multiplexing filter is connected with one end of a second OEO device in another one of the optical sub-paths; and the C interface of the second wavelength division multiplexing filter is connected with the first interface of the second optical diplexer, the R interface of the second wavelength division multiplexing filter is connected with the other end of the first OEO device in the one of the optical sub-paths, and the P interface of the second wavelength division multiplexing filter is connected with the other end of the second OEO device in the another one of the optical sub-paths.

The downlink light from the first PON system is emitted by the OLT of the first PON system to the second interface of the first optical diplexer through the trunk optical fiber at the OLT side, output to the C interface of the first wavelength division multiplexing filter in the second optical path from the third interface of the first optical diplexer, then output to the first OEO device from the R interface of the first wavelength division multiplexing filter, amplified by the first OEO device and then output to the R interface of the second wavelength division multiplexing filter, then returned to the second optical path from the C interface of the second wavelength division multiplexing filter and passed to the first interface of the second optical diplexer, and finally output from the second interface of the second optical diplexer to return to the trunk optical path, passed to the optical splitter and the branch optical fibers and reached to the ONUs;

the uplink light from the first PON system is emitted by the ONU of the first PON system to the second interface of the second optical diplexer through the branch optical fiber and the optical splitter, then output to the first optical path from the third interface of the second optical diplexer, amplified by the optical amplifier and then output to the first interface of the first optical diplexer, input to the trunk optical fiber from the second interface of the first optical diplexer, and finally transmitted to the OLT of the first PON system;

the downlink light from the second PON system is emitted by the OLT of the second PON system to the second interface of the first optical diplexer through the trunk optical fiber, output to the interface C of the first wavelength division multiplexing filter in the second optical path from the third interface of the first optical diplexer, then passed to the second OEO device from the P interface of the first wavelength division multiplexing filter, amplified by the second OEO device and then output to the P interface of the second wavelength division multiplexing filter, then returned to the second optical path from the C interface of the second wavelength division multiplexing filter and passed to the first interface of the second optical diplexer, and finally output back to the trunk optical path from the second interface of the second optical diplexer, passed to the optical splitter and the branch optical fiber and reached to the ONU; and the uplink light from the second PON system is emitted by the ONU of the second PON system to the second interface of the second optical diplexer through the branch optical fiber and the optical splitter, then output into the first optical path from the third interface of the second optical diplexer, amplified by the optical amplifier and then output to the first interface of the first optical diplexer, then output to the trunk optical fiber from the second interface of the first optical diplexer, and finally transmitted to the OLT of the second PON system.

The optical amplifier may be a wideband Semiconductor Optical Amplifier (SOA).

The first optical path may be configured to transmit the uplink light from the different PON systems, and the second optical path may be configured to transmit the downlink light from the different PON systems.

A method for processing uplink and downlink light with a long-distance box includes that:

uplink light and downlink light from different Passive Optical Network (PON) systems are split, the uplink light from the different PON systems is transmitted through a first optical path, and the downlink light from the different PON systems is transmitted through a second optical path;

wherein the uplink light from the different PON systems is amplified by an optical amplifier and then output to Optical Line Terminals (OLTs) of the respective systems; the downlink light from the different PON systems with the different wavelengths is transmitted through different optical sub-paths of the second optical path according to the wavelengths of the downlink light, and the downlink light is amplified by different Optical-Electrical-Optical (OEO) conversion devices in the different optical sub-paths and then output to Optical Network Units (ONUs) of the respective systems.

It can be seen from the above technical solution of the disclosure that, the uplink lights from the different PON systems and the downlink lights from the different PON systems are split, the uplink lights from the different PON systems are transmitted by the first optical path, and the downlink lights from the different PON systems are transmitted by the second optical path; wherein the uplink lights from the different PON systems are amplified by an optical amplifier and then output to the OLTs of the respective systems; according to the wavelengths of the downlink light from the different PON systems, the downlink light with the different wavelengths are transmitted by the different optical sub-paths of the second optical path, and are amplified by the different OEO converters in the different optical sub-paths and then are output to the ONUs of the respective systems. The disclosure applies a hybrid long-distance combining OEO and OA technologies to process a coexisting PON system, integrates advantages of both OA and OEO, and has high reliability, such that both uplink lights and downlink lights from different PON systems are amplified effectively.

DETAILED DESCRIPTION

Figure 3:
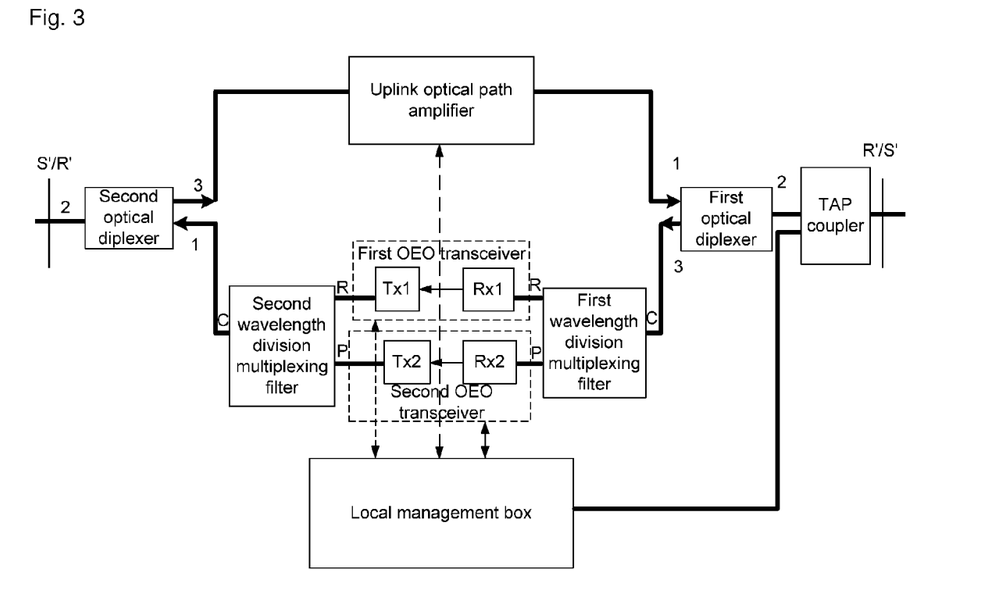
FIG. 3 shows a structure diagram of a long-distance box in the disclosure.

FIG. 3 shows a structure diagram of a long-distance box in the disclosure, and as shown in FIG. 3, the long-distance box in the disclosure, which applies a combination of an Optical-Electrical-Optical (OEO) converter and an Optical Amplifier (OA), mainly includes an optical diplexer, an OA, a Wavelength Division Multiplexing (WDM) filter, an OEO device and a local management box, wherein, the optical diplexer (which may be realized by an optical circulator in a practical application) connects the long-distance box to a trunk optical fiber, and is configured to split uplink lights and downlink lights from different PON systems, and the optical diplexer includes a first optical diplexer and a second optical diplexer, so that between the first optical diplexer and the second optical diplexer, the uplink lights from the different PON systems are transmitted by a first optical path and the downlink lights from the different PON systems are transmitted by a second optical path.

The optical amplifier is located in the first optical path, and is configured to amplify the uplink lights from the different PON systems and then output the amplified uplink lights. The optical amplifier may be a Semiconductor Optical Amplifier (SOA).

The wavelength division multiplexing filter is located in the second optical path, and is configured to divide the second optical path into different optical sub-paths according to different wavelengths, wherein the downlink light from the different PON systems are amplified by the different optical sub-paths and then output to the optical diplexer. As the long-distance box as shown in FIG. 3 takes two coexisting PON systems as an example, the downlink optical path is divided into two optical sub-paths, the wavelength division multiplexing filter includes a first wavelength division multiplexing filter and a second wavelength division multiplexing filter, wherein the first wavelength division multiplexing filter divides the downlink optical path into different optical sub-paths, and the second wavelength division multiplexing filter combines the downlink light from the different optical sub-paths and then outputs the combined downlink light.

The OEO devices may be multiple OEO devices respectively located in the different optical sub-paths which are respectively configured to amplify the downlink light from the different PON systems. As the long-distance box as shown in FIG. 3 takes two coexisting PON systems as the example, the OEO device includes a first OEO device and a second OEO device, which are respectively located in two optical sub-paths between the first wavelength division multiplexing filter and the second wavelength division multiplexing filter, and are configured to amplify the downlink signals from two different PON systems.

Figure 4:
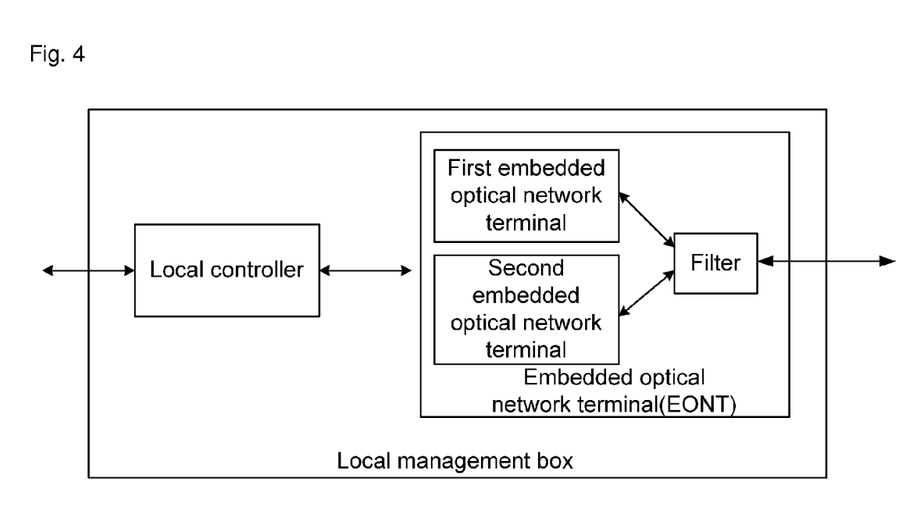
FIG. 4 shows a structure diagram of a local management box in the disclosure.

Besides, the local management box is connected with an OLT through a TAP coupler and the trunk optical fiber, the local management box includes a local controller, an EONT and a filter (not shown in FIG. 3 with the purpose of simplification), and the detailed structure of a local management box is shown in FIG. 4; and FIG. 4 shows a structure diagram of the local management box in the disclosure, an instruction signal of the OLT reaches the EONT of the local management box through the TAP coupler, and then respectively reaches the corresponding sub-EONT after being split by the filter; the EONT transmits a relevant instruction to the local controller; the local controller manages and controls a long-distance amplification device according to the instruction, and then feeds back a result to the EONT; and according to signals from different PON systems, feedback information are sent by the sub-EONTs corresponding to the signals to the corresponding OLTs through the filter, the TAP coupler and the trunk optical fiber. The realization of the EONT is common knowledge for those skilled in the art, which will not be described again herein, and the specific implementation solution of the EONT is not intended to limit the scope of protection of the disclosure.

Figure 5:
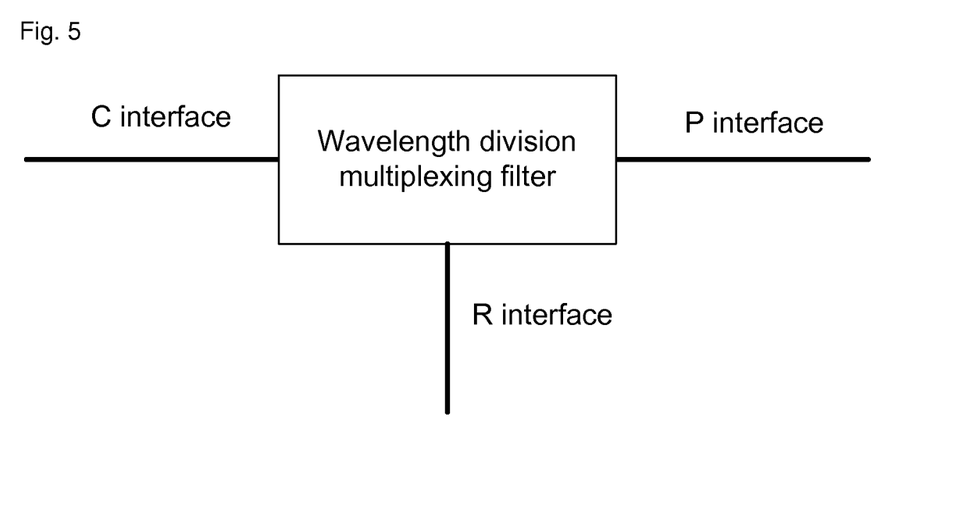
FIG. 5 shows an interface diagram of a wavelength division multiplexing filter in the disclosure.

FIG. 5 shows an interface diagram of a wavelength division multiplexing filter, as shown in FIG. 3, the wavelength division multiplexing filter is related to the wavelength of a PON system, such as a PON system with coexistence of GPON and XG-PON, and the wavelength division multiplexing filter may consist of a sideband filter, the downlink light from the first PON system is reflected, that is, the downlink light from the GPON is input/output only through a R interface of the filter, and the downlink light from the XG-PON is transmitted, that is, the downlink light from the XG-PON is input/output only through a P interface of the filter. A C interface of the filter is connected with an optical diplexer at the trunk optical fiber.

Figure 6:
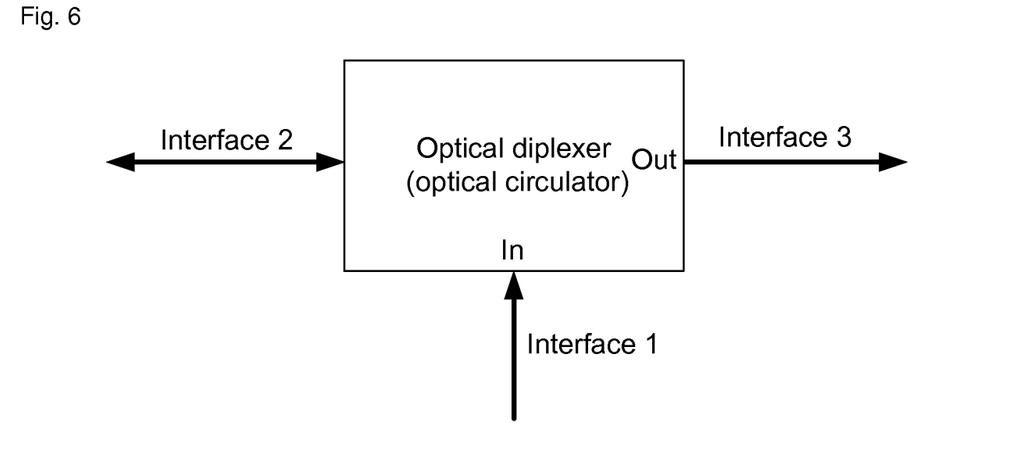
FIG. 6 shows an interface diagram of an optical circulator in the disclosure.

FIG. 6 shows an interface diagram of an optical diplexer in the disclosure, and as shown in FIG. 6, the optical diplexer, which is an optical circulator herein, has three interfaces which are marked as interface 1 (first interface), interface 2 (second interface) and interface 3 (third interface) respectively. Wherein, the interface 1 is a light input port, that is, light can be input from the interface 1 but can not be output from the interface 1, the interface 2 is a light input/output port, that is, light can be input or output from the interface 2, and the interface 3 is a light output port, that is, light can be output from the interface 3 but can not be input from the interface 3. According to a feature of the optical circulator, a transmission direction of light can only be: from the interface 1 to the interface 2 or from the interface 2 to the interface 3, and other paths are prohibited.

In the disclosure, a hybrid long-distance box combining OEO and OA technologies is utilized, advantages of both OA and OEO are integrated, and reliability is high, such that the uplink light and the downlink light from different PON systems are amplified effectively.

A working principle of the long-distance box in the disclosure will be described in detail with reference to FIG. 2, FIG. 3 and FIG. 4 by taking a PON system with coexistence of GPON and XG-PON as an example hereinafter. A PON system with coexistence of a first PON system and a second PON system will be taken as an example.

As shown in FIG. 3, a first optical path (one-way) and a second optical path (one-way) are formed by the first optical diplexer and the second optical diplexer, one SOA is arranged in the first optical path, that is, for a PON system with coexistence of the first PON system such as GPON and the second PON system such as XG-PON, the SOA amplifies the uplink light from both the GPON and the XG-PON, that is, light with a wavelength 1260 nm-1330 nm is amplified. The second optical path forms two optical sub-paths by a first wavelength division multiplexing filter and a second wavelength division multiplexing filter, a first OEO device (also called OEO transceiver) is arranged in a first optical sub-path, the first OEO device only amplifies the downlink light from the first PON system by means of OEO, and a second OEO device with another wavelength is arranged in a second optical sub-path, and the second OEO device only amplifies the downlink light from the second PON system by means of OEO. The OLT manages and controls the two OEO devices through the local management box, including control in such as burst mode, clock synchronization and the like.

The downlink light from the first PON system is emitted by the OLT of the first PON system to the second interface of the first optical diplexer through the trunk optical fiber at the OLT side, output to a C interface of the first wavelength division multiplexing filter in the second optical path from the third interface of the first optical diplexer, then output to the first OEO device from a R interface of the first wavelength division multiplexing filter, amplified by the first OEO device and then output to the R interface of the second wavelength division multiplexing filter, then returned to the second optical path from a C interface of the second wavelength division multiplexing filter and passed to the first interface of the second optical diplexer, and finally output from the second interface of the second optical diplexer to return to the trunk optical path, passed to the optical splitter and the branch optical fibers and transmitted to the ONUs.

The uplink light from the first PON system is emitted by the ONU of the first PON system to the second interface of the second optical diplexer through the branch optical fiber and the optical splitter, then output from the third interface of the second optical diplexer and passed to the first optical path, amplified by the optical amplifier and then output to the first interface of the first optical diplexer, then input to the trunk optical fiber from the second interface of the first optical diplexer, and finally transmitted to the OLT of the first PON system.

The downlink light from the second PON system is emitted by the OLT of the second PON system to the second interface of the first optical diplexer through the trunk optical fiber, output to the C interface of the first wavelength division multiplexing filter on the second optical path from the third interface of the first optical diplexer, then output to the second OEO device from the P interface of the first wavelength division multiplexing filter, amplified by the second OEO device and then output to the P interface of the second wavelength division multiplexing filter, then returned to the second optical path from the C interface of the second wavelength division multiplexing filter and passed to the first interface of the second optical diplexer, and finally output from the second interface of the second optical diplexer to return to the trunk optical path, passed to the optical splitter and the branch optical fibers and transmitted to the ONUs.

The uplink light from the second PON system is emitted by the ONU of the second PON system to the second interface of the second optical diplexer through the branch optical fiber and the optical splitter, then output to the first optical path from the third interface of the second optical diplexer, amplified by the optical amplifier and then output to the first interface of the first optical diplexer, then output from the second interface of the first optical diplexer and passed to the trunk optical fiber, and finally transmitted to the OLT of the second PON system.

For the system with coexistence of PON and 10G-EPON as shown in FIG. 3, the first PON system is EPON and the second PON system above is 10G-EPON. As the uplink light (1260-1360 nm) from the EPON and the uplink light (1260-1280 nm) from the 10GEPON have an overlapped wave band, if the OEO way is adopted, the implementation is troublesome, while the SOA way is adopted for the uplink in the disclosure, so that a transmission method of uplink light from a coexisting PON system with an overlapped wave band in the uplink is implemented simply.

Figure 7:
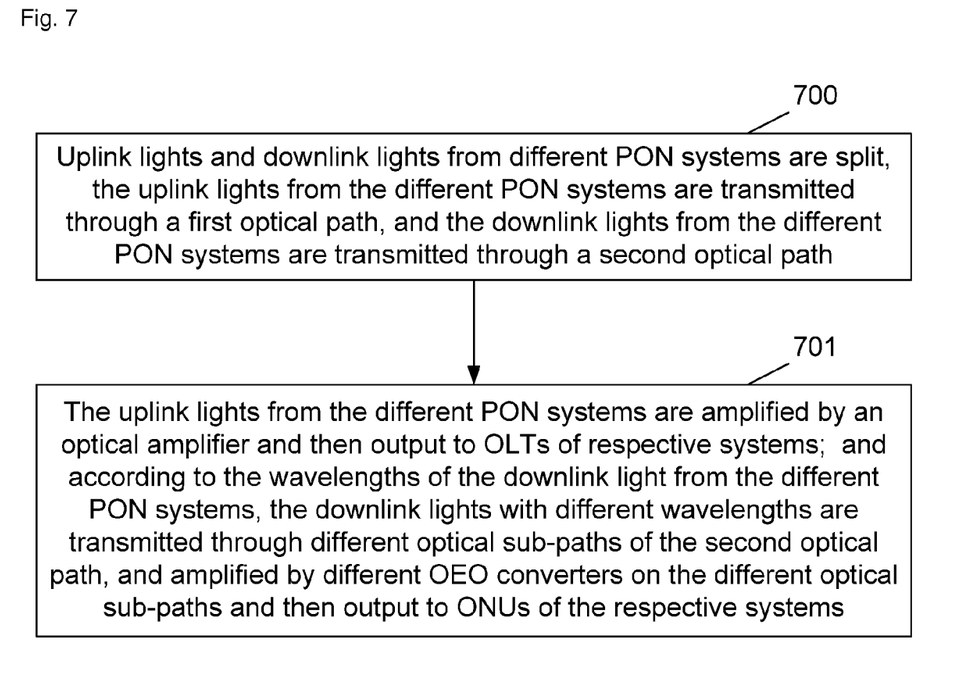
FIG. 7 shows a flow diagram of a method for processing unlink and downlink light with a long-distance box described in the disclosure.

FIG. 7 shows a flow diagram of a method for processing unlink and downlink light with a long-distance box in the disclosure, and as shown in FIG. 7, the method includes the following steps that:

S700: uplink lights and downlink lights from different PON systems are split, the uplink lights from the different PON systems are transmitted through a first optical path, and the downlink lights from the different PON systems are transmitted through a second optical path.

In the step, the uplink lights from the different PON systems and the downlink lights from the different PON systems are split, so that different processing ways can be respectively adopted for the uplink lights and the downlink lights.

S701: the uplink lights from the different PON systems are amplified by an optical amplifier and then output to OLTs of respective systems; and according to the wavelengths of the downlink lights from the different PON systems, the downlink lights with different wavelengths are transmitted by different optical sub-paths of the second optical path, and amplified by different OEO converters in the different optical sub-paths and then output to ONUs of the respective systems.

In the step, for the uplink light from the different PON systems, there is an overlapped wave band in a PON system with coexistence of EPON and 10GEPON, in view of which an optical amplifying way such as SOA is adopted in the method of the disclosure to simply implement amplification of the uplink light from the coexisting PON system with the overlapped wave band. For the downlink light with different wavelengths, corresponding OEO transceivers are respectively utilized through reflection or transmission to perform amplification.

It can be seen from the method of the disclosure as shown in FIG. 7 that, the method applies a hybrid long-distance box combining OEO and OA technologies to process a point-to-multipoint fiber access of a coexisting PON system, integrates advantages of both OA and OEO, and has high reliability, such that the uplink lights from the different PON systems and the downlink lights from the different PON systems are amplified effectively.

The above are just the preferred embodiments of the disclosure and are not intended to limit the scope of protection of the disclosure; any modification, equivalent replacement and improvement made within the spirit and principle of the disclosure should be included within the scope of protection of the disclosure.

The invention claimed is:

1. A long-distance box for Gigabit-capable Passive Optical Networks (GPON) system and 10 GPON (XG-PON) system sharing one Optical Distribution Network (ODN) in a passive optical network, comprising a first optical diplexer, a second optical diplexer, an Optical Amplifier (OA), a first wavelength division multiplexing filter, a second wavelength division multiplexing filter, a first Optical-Electrical-Optical (OEO) conversion device, a second OEO device and a local management box; wherein, the first optical diplexer consists of an optical circulator and the first optical diplexer is configured to split uplink lights and downlink lights from the GPON system and the XG-PON system; the second optical diplexer consists of an optical circulator, and the second optical diplexer is configured to split uplink lights and downlink lights from the GPON system and the XG-PON system;

the optical circulator of the first optical diplexer and the optical circulator of the second optical diplexer respectively have a first interface, a second interface and a third interface, wherein the first interface is a light input port, the second interface is a light input/output port, and the third interface is a light output port;

the first interface of the first optical diplexer is connected with the first optical path, the second interface of the first optical diplexer is connected with the trunk optical fiber, and the third interface of the first optical diplexer is connected with the second optical path; and the first interface of the second optical diplexer is connected with the second optical path, the second interface of the second optical diplexer is connected with the ODN shared by the GPON system and the XG-PON system, and the third interface of the second optical diplexer is connected with the first optical path;

the uplink lights from the GPON system and the XG-PON system enter the first optical path through the second optical diplexer from a branch optical fiber and an optical splitter; and the downlink lights from the GPON system and the XG-PON system enter the second optical path through the first optical diplexer from the trunk optical fiber;

the optical amplifier is located in the first optical path, and configured to amplify the uplink lights from the GPON system and the XG-PON systems and then output the amplified uplink lights;

the first and the second wavelength division multiplexing filters are located in the second optical path, and the first wavelength division multiplexing filter is configured to divide the second optical path into a first optical sub-path and a second optical sub-path according to the wavelengths of the GPON system and the XG-PON system, wherein the downlink lights from the GPON system and the XG-PON system are amplified by the first and the second optical sub-paths and then output;

the first wavelength division multiplexing filter outputs the downlink lights which enter the second optical path from the first optical diplexer to the first and the second optical sub-paths, and the second wavelength division multiplexing filter combines the downlink lights from the first and the second optical sub-paths and then outputs the combined downlink lights to the second optical diplexer;

the first wavelength division multiplexing filter consists of a sideband filter and the second wavelength division multiplexing filter consists of a sideband filter; the sideband filter of the first wavelength division multiplexing filter and the sideband filter of the second wavelength division multiplexing filter respectively comprise a R interface, a P interface and a C interface; wherein the downlink lights from the GPON system are reflected and input/output only through the R interface, and the downlink lights from the XG-PON system are transmitted and input/output only through the P interface; and the C interface is connected with the first optical diplexer at the trunk optical fiber;

the C interface of the first wavelength division multiplexing filter is connected with the third interface of the first optical diplexer, the R interface of the first wavelength division multiplexing filter is connected with one end of the first OEO device in the first optical sub-path, and the P interface of the first wavelength division multiplexing filter is connected with one end of the second OEO device in the second optical sub-path; and the C interface of the second wavelength division multiplexing filter is connected with the first interface of the second optical diplexer, the R interface of the second wavelength division multiplexing filter is connected with the other end of the first OEO device in the first optical sub-path, and the P interface of the second wavelength division multiplexing filter is connected with the other end of the second OEO device in the second optical sub-path; and the local management box is connected with an Optical Line Terminal (OLT) through a TAP coupler and the trunk optical fiber, and the OLT controls and manages the optical amplifier and the OEO conversion devices through the local management box.

2. The long-distance box according to claim 1, wherein, the downlink lights from the GPON system are emitted by an OLT of the GPON system to the second interface of the first optical diplexer through the trunk optical fiber at the OLT, output to the C interface of the first wavelength division multiplexing filter in the second optical path from the third interface of the first optical diplexer, then output to the first OEO device from the R interface of the first wavelength division multiplexing filter, amplified by the first OEO device and then output to the R interface of the second wavelength division multiplexing filter, then returned to the second optical path from the C interface of the second wavelength division multiplexing filter and passed to the first interface of the second optical diplexer, and finally output from the second interface of the second optical diplexer to return to a trunk optical path, passed to the optical splitter and the branch optical fiber and transmitted to an ONU of the GPON system;

the uplink lights from the GPON system are emitted by the ONU of the GPON system to the second interface of the second optical diplexer through the branch optical fiber and the optical splitter, then output to the first optical path from the third interface of the second optical diplexer, amplified by the optical amplifier and then output to the first interface of the first optical diplexer, input to the trunk optical fiber from the second interface of the first optical diplexer, and finally transmitted to the OLT of the GPON system;

the downlink lights from the XG-PON system are emitted by an OLT of the XG-PON system to the second interface of the first optical diplexer through the trunk optical fiber, output to the C interface of the first wavelength division multiplexing filter in the second optical path from the third interface of the first optical diplexer, then passed to the second OEO device from the P interface of the first wavelength division multiplexing filter, amplified by the second OEO device and then output to the P interface of the second wavelength division multiplexing filter, then returned to the second optical path from the C interface of the second wavelength division multiplexing filter and passed to the first interface of the second optical diplexer, and finally output back to the trunk optical path from the second interface of the second optical diplexer, passed to the optical splitter and branch optical fibers and transmitted to an ONU of the XG-PON system; and the uplink lights from the XG-PON system are emitted by the ONU of the XG-PON system to the second interface of the second optical diplexer through the branch optical fiber and the optical splitter, then output to the first optical path from the third interface of the second optical diplexer, amplified by the optical amplifier and then output to the first interface of the first optical diplexer, then output to the trunk optical fiber from the second interface of the first optical diplexer, and finally transmitted to the OLT of the XG-PON system.

3. The long-distance box according to claim 1, wherein the optical amplifier is a wideband Semiconductor Optical Amplifier (SOA).

4. A method for processing uplink and downlink lights with a long-distance box, comprising:

downlink lights from a GPON system are emitted by an OLT of the GPON system to a second interface of a first optical diplexer through trunk optical fiber at an OLT, output to a C interface of a first wavelength division multiplexing filter in a second optical path from a third interface of the first optical diplexer, then output to a first OEO device from a R interface of the first wavelength division multiplexing filter, amplified by the first OEO device and then output to a R interface of a second wavelength division multiplexing filter, then returned to the second optical path from a C interface of the second wavelength division multiplexing filter and passed to a first interface of a second optical diplexer, and finally output from a second interface of the second optical diplexer to return to the trunk optical path, passed to a optical splitter and a branch optical fiber and transmitted to an ONU of the GPON system;

the uplink lights from the GPON system are emitted by the ONU of the GPON system to the second interface of the second optical diplexer through the branch optical fiber and the optical splitter, then output to a first optical path from a third interface of the second optical diplexer, amplified by an optical amplifier and then output to a first interface of the first optical diplexer, input to the trunk optical fiber from the second interface of the first optical diplexer, and finally transmitted to the OLT of the GPON system;

downlink lights from a XG-PON system are emitted by the OLT of the XG-PON system to the second interface of the first optical diplexer through the trunk optical fiber, output to the C interface of the first wavelength division multiplexing filter in the second optical path from the third interface of the first optical diplexer, then passed to a second OEO device from a P interface of the first wavelength division multiplexing filter, amplified by the second OEO device and then output to a P interface of the second wavelength division multiplexing filter, then returned to the second optical path from the C interface of the second wavelength division multiplexing filter and passed to the first interface of the second optical diplexer, and finally output back to the trunk optical path from the second interface of the second optical diplexer, passed to the optical splitter and the branch optical fibers and transmitted to an ONU of the XG-PON system; and the uplink lights from the XG-PON system are emitted by the ONU of the XG-PON system to the second interface of the second optical diplexer through the branch optical fiber and the optical splitter, then output to the first optical path from the third interface of the second optical diplexer, amplified by the optical amplifier and then output to the first interface of the first optical diplexer, then output to the trunk optical fiber from the second interface of the first optical diplexer, and finally transmitted to the OLT of the XG-PON system.

5. The method according to claim 4, wherein the optical amplifier is a wideband Semiconductor Optical Amplifier (SOA).

* * * * *